Jan. 10, 1928.
J. LARSON
1,655,869
COMBINATION TIRE CARRIER AND RIM SPREADER
Filed Nov. 23, 1926   2 Sheets-Sheet 1
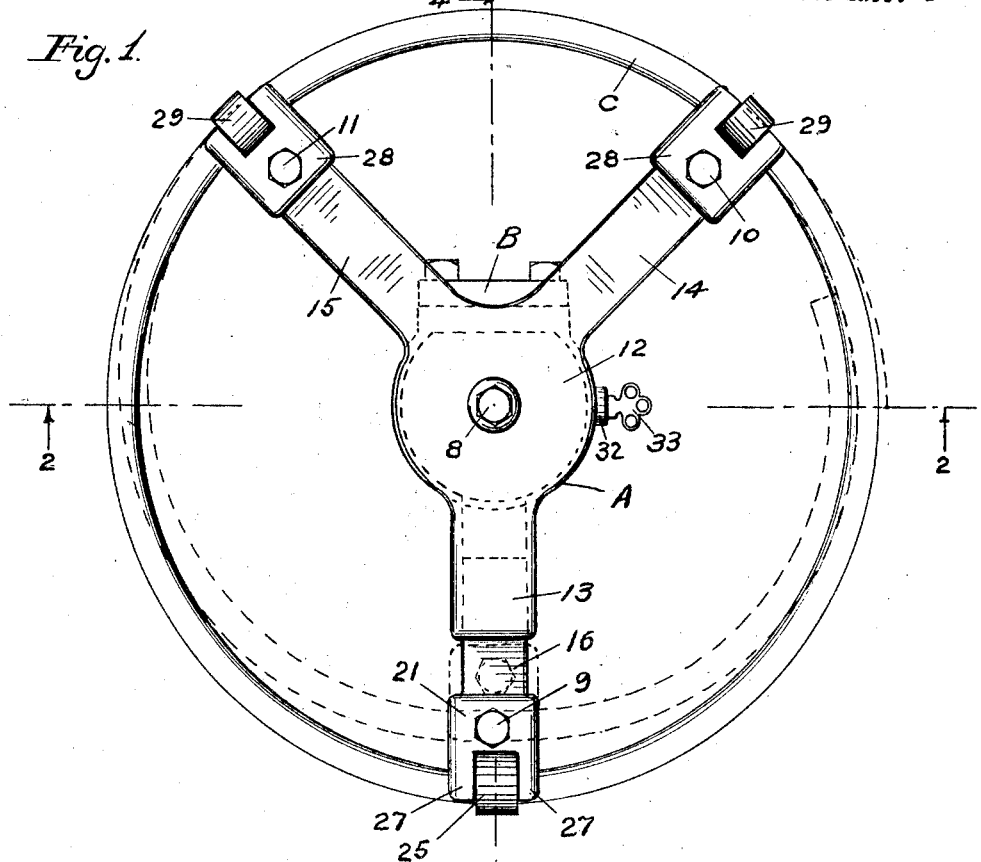
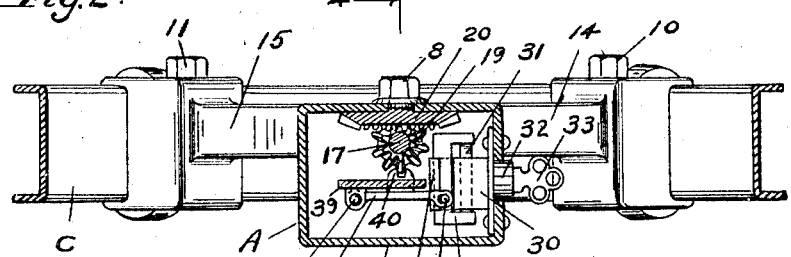
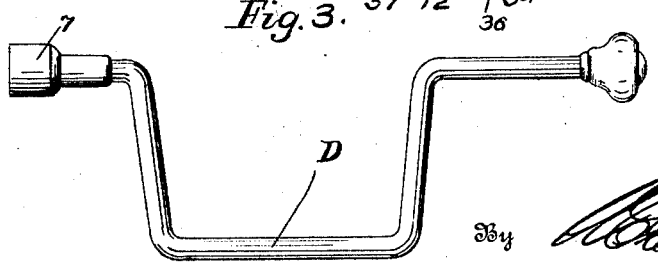
Inventor
JOHN LARSON Jan. 10, 1928.

J. LARSON 1,655,869

COMBINATION TIRE CARRIER AND RIM SPREADER

Filed Nov. 23, 1926  2 Sheets-Sheet 2

Inventor
JOHN LARSON
By
Attorney

Patented Jan. 10, 1928.

1,655,869

UNITED STATES PATENT OFFICE.

JOHN LARSON, OF WALNUT GROVE, MINNESOTA, ASSIGNOR OF ONE-FOURTH TO JOHN A. SABIN, OF WALNUT GROVE, MINNESOTA.

COMBINATION TIRE CARRIER AND RIM SPREADER.

Application filed November 23, 1926. Serial No. 150,357.

This invention relates to automotive equipment, and the main object is to provide an improved and efficient construction of tire carrier, which also embodies a rim spreader and contractor, which may be conveniently used for removing and replacing a tire with respect to its rim, when it is desired to repair the tire. Further and more specific objects will be disclosed in the course of the following specification, reference being had to the accompanying drawings, in which:

Fig. 1 is a plan elevation of the device, and showing a tire rim in place upon it.

Fig. 2 is a sectional view about as on the line 2—2 in Fig. 1.

Fig. 3 represents a convenient form of socket wrench for manipulating the mechanism of my improved carrier.

Figure 4:
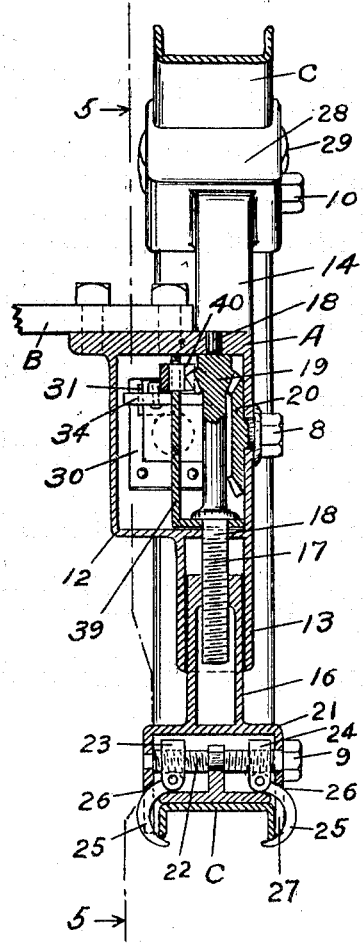
Fig. 4 is a sectional elevation as on the line 4—4 in Fig. 1.
Figure 5:
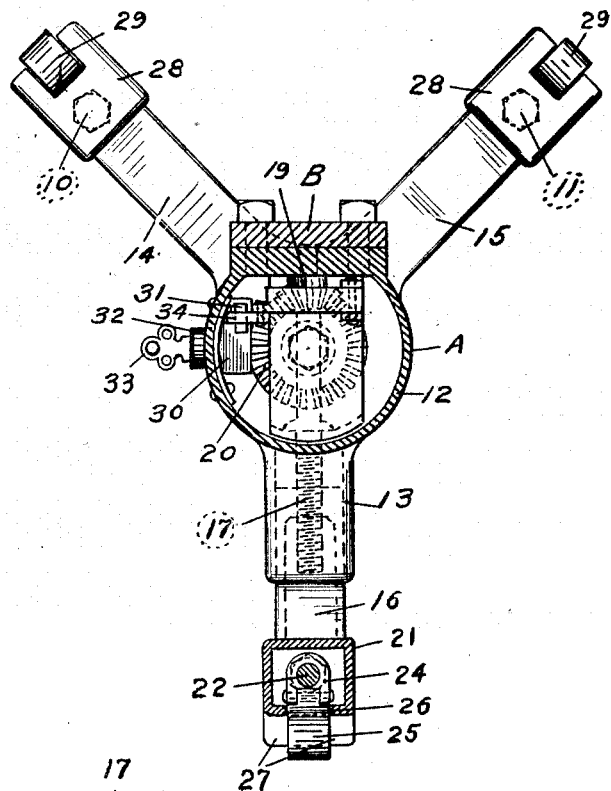
Fig. 5 is a rear view, partly in section, as on the line 5—5 in Fig. 4.

Referring to the drawing more particularly and by reference characters A designates the main frame of the carrier, which is suitably secured, as by a bracket B, to the car, while C designates a tire rim, of the split ring type. D depresents a wrench having a socket head 7, adapted to fit over and turn the heads 8, 9, 10 and 11.

The body A proper of the carrier is carried by the bracket B, and consists, primarily, of a central housing or box 12, from which extends three hollow radial arms 13, 14 and 15. Projecting from and slidably secured in the radial arm 13 is a non-rotatable shank or bar 16, which is internally threaded to receive a threaded bolt 17, journaled, as at 18, in the housing 12. The upper end of the bolt 17 is provided with a bevel pinion 19, which meshes with a bevel gear 20, also journaled in the box 12 and which carries the nut or bolt head 8, so that by turning the member 8, it will be seen that the shank 16 will be either projected or retracted, as may be desired.

Figure 6:
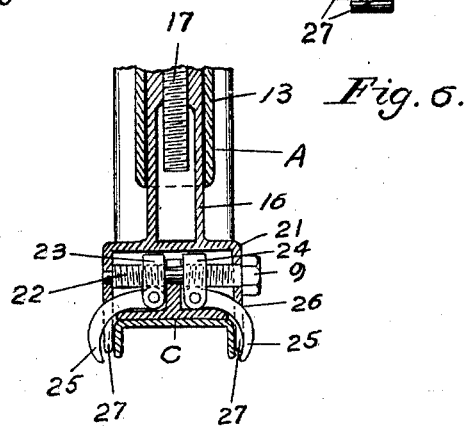
Fig. 6 is a sectional detail view, similar to the lower end of Fig. 4, but showing the rim engaging claws in a retracted position.

The outer or lower end of the shank member 16 is provided with a relatively wide (from front to back) head 21 in which is journaled a bolt 22 having the head 9. This bolt has reversed threads, on its opposite end portions, which carry a pair of traveller blocks 23 and 24 to which are pivoted a pair of claws or fingers 25, extending out through slots 26 of the head. These claws also operate between ears 27 of the head, which ears form a convenient channel recess for the rim C. When the bolt 9—22 is turned so that the members 23—24 are in their inner positions, as shown in Fig. 6, then the claws 25 are in retracted or inoperative positions. But when the bolt is turned to spread the members 23—24, then the claws 25 are projected in a curve so as to turn in over and impinge upon the flanges of the tire rim, as shown in Fig. 4, so as to grip it firmly against the head 21. The outer ends of the radial arms 14 and 15 are provided with heads 28, having claws 29, which are operated by the bolts 10 and 11, and are substantially the same in structure and function to that just described in connection with the lower head 21.

A locking mechanism is employed to prevent the rotation of the bolt 17, by unauthorized persons, and may be briefly described as follows:

Secured to the inner side of the casing 12 is a lock 30, having a sliding bolt 31, and having a projecting cylinder 32 to receive the key 33. The bolt 31 engages, and is adapted, when actuated by the turning of the key 33, to reciprocate a substantially U-shaped member 34 which is slidably held in a guide 35. The member 34 has a pin 36 which engages a lever 37, pivoted as at 38 to a bracket support 39. The lever 37 has a notched lug 40 which operates through a slot in the support 39 to engage a tooth of the pinion 19, to prevent it from turning when the lock 30 is locked, but is retracted to permit the pinion to turn when the lock is unlocked by the key 33.

The use and operation of the device may be described as follows:

When used merely as a tire carrier the device is employed as shown in Fig. 1, i. e., the rim C, and the tire which it carries but which is not shown, is primarily carried by the two heads 28 and the head 21 is extended so as to secure the rim rigidly with respect to the carrier. To remove the rim (with its tire) the lock 30 is first unlocked by the key 33. The wrench 6 is then applied to the gear head 8 and turned so as to rotate the bolt 17 and retract the shank 16 to release the head 21 from the rim. The rim is then pulled away from the head 21, when it may be released from the heads 28 by being lifted off of them. To replace the same or another rim, and tire, the operation is of course reversed.

To remove a tire from the rim is accomplished as follows: The bolts 9, 10, and 11 are turned so that the claws 25 and 29 are projected to firmly grip the rim, as in Fig. 4. With the lock 30 unlocked, pressure is now applied, by the wrench, to forcibly project the shank 16 until the rim divides, where its ends meet, so that said ends may be offset from each other, to permit them to overlap when the rim is contracted. To contract the rim to a reduced circumference, so that the tire can be removed, it is now only necessary to reverse the wrench to retract the shank 16. As the rim is firmly gripped at three circumferential points, it will be seen that the forced reduction of diameter will be easily accomplished. When the tire has been repaired it is replaced upon the rim which is then again opened up until its ends may be interlocked. The position of the contracted rim is indicated by dotted lines in Fig. 1.

It is understood that suitable modifications may be made in the general design and structural details of the invention as herein shown and described, provided, however, that said modifications come within the spirit and scope of the appended claims. Having now therefore fully shown and described my invention, what I claim to be new and desire to protect by Letters Patent is:

1. A tire carrier having heads for circumferentially spaced engagement with the rim of the tire, means for spreading and contracting said heads with respect to each other, and gripping members carried by said heads for gripping the tire rim thereagainst, the gripping members of the respective heads each including a jaw which is slidable in the head whereby it may be retracted to permit the rim to be removed from the heads.

2. A tire carrier having heads for circumferentially spaced engagement with the rim of the tire, means for spreading and contracting said heads with respect to each other, and gripping members carried by said heads for gripping the tire rim thereagainst, the gripping members of the respective heads each comprising a pair of curved jaws slidably mounted in the head, and means for simultaneously projecting and retracting the jaws.

In testimony whereof I affix my signature.

JOHN LARSON.